US008384592B1

(12) United States Patent
Crary et al.

(10) Patent No.: US 8,384,592 B1
(45) Date of Patent: Feb. 26, 2013

(54) FFT BASED ACQUISITION TECHNIQUES FOR SATELLITE BASED NAVIGATION SYSTEMS

(75) Inventors: Philip Crary, Mission Viejo, CA (US); Qinfang Sun, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 193 days.

(21) Appl. No.: 12/570,942

(22) Filed: Sep. 30, 2009

(51) Int. Cl.
*G01S 19/30* (2010.01)
*G01S 19/24* (2010.01)
*G01S 19/37* (2010.01)

(52) U.S. Cl. .......... 342/357.69; 342/357.63; 342/357.77

(58) Field of Classification Search .......... 342/357.63, 342/357.67–357.69, 357.75–357.77
See application file for complete search history.

(56) References Cited

U.S. PATENT DOCUMENTS

| 5,663,734 | A  | * | 9/1997  | Krasner         | 342/357.25 |
| 6,133,873 | A  | * | 10/2000 | Krasner         | 342/357.59 |
| 6,931,055 | B1 |   | 8/2005  | Underbrink et al. |           |
| 7,053,827 | B2 | * | 5/2006  | Awata           | 342/357.68 |
| 7,471,241 | B1 | * | 12/2008 | Yang            | 342/357.73 |
| 7,498,981 | B2 | * | 3/2009  | Gaynor et al.   | 342/357.68 |
| 7,505,508 | B2 | * | 3/2009  | Sullivan        | 375/147 |
| 7,548,199 | B2 | * | 6/2009  | Winternitz et al. | 342/357.63 |
| 7,573,423 | B2 | * | 8/2009  | Monnerat        | 342/357.68 |
| 7,800,535 | B2 | * | 9/2010  | Bloebaum et al. | 342/357.77 |
| 2009/0079627 | A1 |   | 3/2009  | Sun et al.      |           |
| 2009/0322599 | A1 |   | 12/2009 | Sun et al.      |           |

OTHER PUBLICATIONS

"A GPS Receiver Optimized for Land Vehicles", R.C. Bryant in *Proceedings of ION GPS-93, The 6th International Technical Meeting of the Satellite Division of The Institute of Navigation*, Salt Lake City, Utah, vol. II Sep. 22-24, 1993, pp. 1599-1606.

* cited by examiner

*Primary Examiner* — Cassie Galt
(74) *Attorney, Agent, or Firm* — DeLizio Gilliam, PLLC

(57) ABSTRACT

A satellite navigation receiver receives a combination of radio frequency signals from satellites in satellite navigation systems and process the radio frequency signals to calculate an approximate current location of the satellite navigation receiver. Satellite acquisition plays an important part in identifying the current location of the satellite navigation receiver. Acquisition involves identifying the satellites in the satellite navigation that can be used to provide navigation information. Fast Fourier transform based acquisition involves using FFT and subsequently inverse FFT (IFFT) to correlate a coarse acquisition (C/A) code transmitted by a satellite with a C/A code locally generated on the GPS receiver to identify and acquire a transmitting satellite.

34 Claims, 6 Drawing Sheets

FFT BASED ACQUISITION TECHNIQUES FOR SATELLITE BASED NAVIGATION SYSTEMS

BACKGROUND

Embodiments of the inventive subject matter generally relate to the field of satellite-based navigation and, more particularly, to search techniques for global positioning systems (GPS) using Fast Fourier Transforms (FFT).

Satellites in satellite navigation systems continuously orbit the Earth while transmitting radio frequency (RF) signals that are used by satellite navigation receivers to provide location and navigation information. Each of the satellite navigation receivers can acquire, track, and process the RF signals from four or more satellites to determine an approximate current location of the satellite navigation receiver. Global positioning system (GPS) is one such commonly used satellite based navigation system.

SUMMARY

Various embodiments are disclosed for fast Fourier transform based acquisition techniques for satellite navigation systems. In one embodiment, input samples of an RF signal from one or more satellites of a plurality of satellites in the satellite navigation system are received. The RF signal is a combination of signals from the one or more satellites of the satellite navigation system. The first set of the input samples are compensated for Doppler shift to yield a compensated first set of samples. The first set of the input samples correspond to the input samples received within a first time interval. A frequency domain representation of the compensated first set of samples is calculated. A frequency domain representation of a coarse acquisition code of a first of the plurality of satellites is also calculated to determine whether the RF signal was transmitted by at least the first of the plurality of satellites. A time domain representation of a result of multiplying the frequency domain representation of the compensated first set of samples and the frequency domain representation of the coarse acquisition code is determined. A peak correlation value is identified from the time domain representation. Information about the first of the plurality of satellites is determined based on the peak correlation value.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to an FFT based search technique for Global Positioning satellite systems (GPS), the FFT based search techniques can be used to acquire satellites in satellite based systems such as GLONASS, Galileo, or a combination of satellite systems (e.g., a combination of GPS and GLONASS, etc). In other instances, well-known instruction instances, protocols, structures, and techniques have not been shown in detail in order not to obfuscate the description.

Acquisition in a GPS navigation system involves identifying GPS satellites that are in line of sight of a GPS receiver and that can be used to provide navigation information. Fast Fourier transform based acquisition involves using FFT and subsequently inverse FFT (IFFT) to correlate a coarse acquisition (C/A) code transmitted by a satellite with a C/A code locally generated on the GPS receiver to identify the transmitting satellite.

Figure 1:
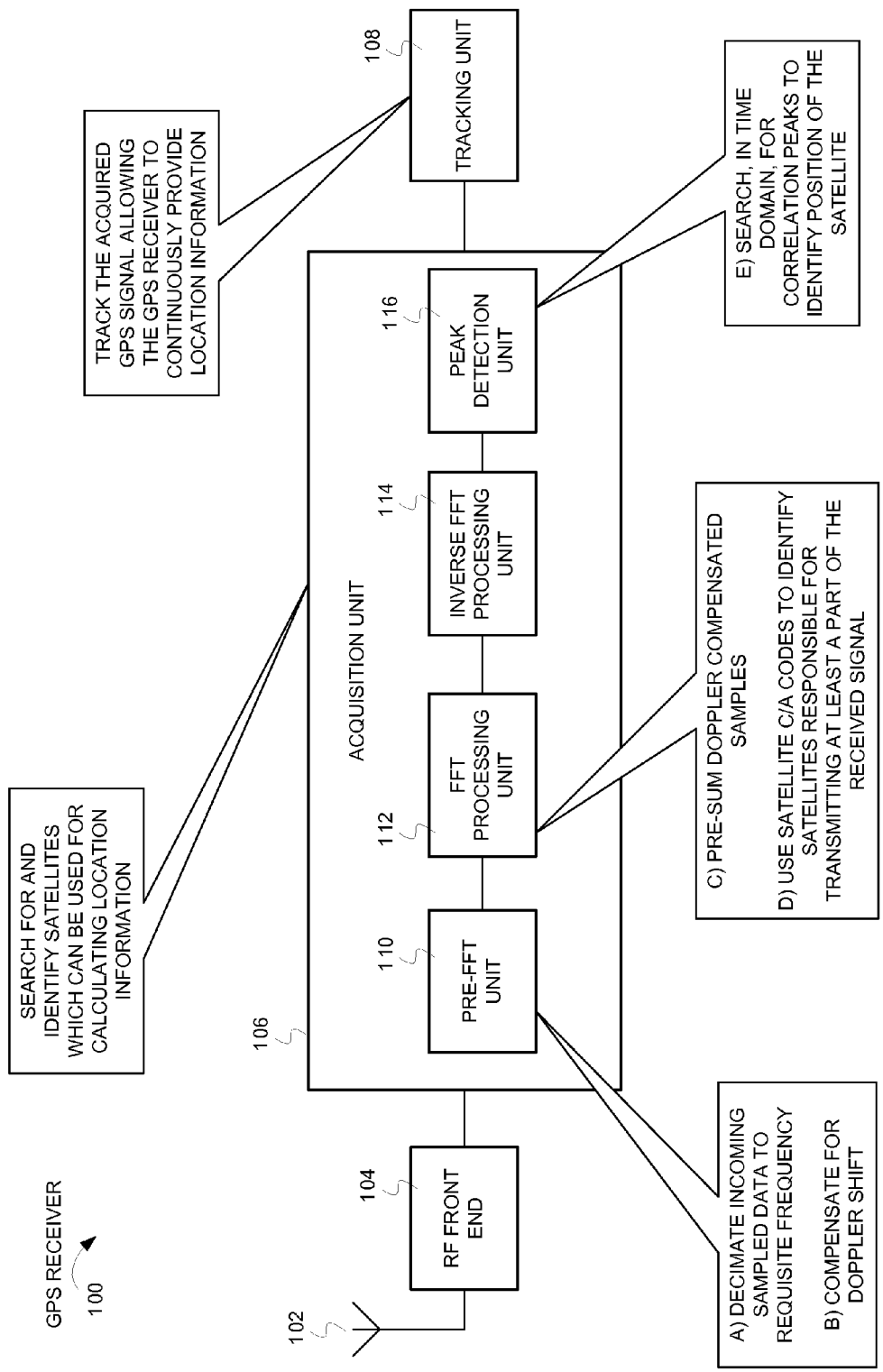
FIG. 1 is an example block diagram of a GPS receiver configured for FFT based satellite acquisition.

FIG. 1 is an example block diagram of a GPS receiver 100 configured for FFT based satellite acquisition. The GPS receiver 100 comprises an antenna 102, a radio frequency (RF) front end 104, an acquisition unit 106, and a tracking unit 108. The acquisition unit 106 comprises a pre-FFT unit 110, an FFT processing unit 112, an inverse FFT (IFFT) processing unit 114, and a peak detection unit 116.

The GPS receiver 100 receives an incoming RF signal from a combination of satellites via the antenna 102. The incoming RF signal is received from multiple GPS-based satellites. In some embodiments, the received RF signal may be a combination of signals received from satellites in different satellite systems (e.g., GPS and GLONASS satellites, etc). The antenna 102 can receive and provide the RF signal to the RF front end 104. The RF front end 104 can comprise 1) one or more amplifying stages to amplify the received RF signal, 2) one or more filtering stages to remove unwanted bands of frequencies, 3) mixer stages to down-convert the received RF signal, 4) an automatic gain control (AGC) unit to adjust the gain to an appropriate level for a range of received signal amplitude levels, 5) an analog to digital converter (ADC) to convert the received RF signal into a digital signal, etc. After the RF front end 104 processes the RF signal and converts the RF signal into its digital representation (e.g., by sampling the analog RF signal), the RF front end 104 provides samples of the RF signal to the acquisition unit 106. The acquisition unit 106 uses the samples of the RF signal to search for and identify satellites, which can be used to determine the location of the GPS receiver 100.

At stage A, the pre-FFT unit 110 in the acquisition unit 106 decimates the incoming sampled RF signal to the requisite frequency. In some implementations, the sampling frequency (typically greater than or equal to the Nyquist frequency of the incoming RF signal) may be too high for performing FFT operations. The pre-FFT unit 110 decimates the incoming samples of the RF signal thus reducing the frequency of the samples of the RF signal. In one implementation, the frequency of the incoming samples of RF signal may be 16 MHz (or even as high as 64 MHz) and the pre-FFT unit 110 may reduce the frequency of the samples at the output of the pre-FFT unit 110 ("decimated samples") to 8 MHz or 4 MHz.

At stage B, the decimated samples are rotated in time to compensate for Doppler shift (a time shift). Different satellite signals travelling along different paths in space may be affected differently by the Doppler shift. Compensating for the Doppler shift allows the GPS receiver 100 to get a better estimate of the position and velocity of the satellite. Compensating for the Doppler shift comprises of two parts—rotating phase of the RF signal to remove the Doppler frequency and performing integrate-and-dump operations on the RF signal to generate integer numbers of samples per chip ("Doppler compensated samples") according to the Doppler frequency. A Numerically Controlled Oscillator (NCO), controlled by the Doppler frequency, typically clocks an integrate-and-dump unit (not shown) that performs the integrate-and-dump operations.

At stage C, the Doppler compensated samples are pre-summed. Samples comprising a first millisecond of data are added to samples comprising a second millisecond of data. The sum of the samples of the first and the second milliseconds of data is added to samples comprising the third millisecond on data and so on. By adding subsequent milliseconds of data to the first millisecond of data to form a single millisecond of samples, the signal-to-noise ratio can be improved. A number of milliseconds over which summing should be performed can depend on a signal level of the RF signal and a size of an RF buffer. The pre-FFT unit 110 provides the Doppler shifted data to the FFT processing unit 112.

At stage D, the FFT processing unit 112 uses satellite coarse acquisition codes (C/A codes) to identify satellites responsible for transmitting the received RF signal. In one implementation, a Gold code may be used as the satellite C/A code. The C/A code is a pseudo random digital sequence comprising 1023 bits. Each satellite has its own unique C/A code and modulates the C/A code onto an RF carrier before transmitting the RF signal. The received RF signal is a combination of signals transmitted by satellites, which are in line of sight of the GPS receiver 100. The FFT processing unit 112 can comprise a C/A code generator to generate C/A codes of each satellite in the satellite system (e.g., the GPS system). The C/A codes generated locally on the GPS receiver may be referred to as "replica C/A codes". The FFT processing unit 112 can identify the satellites that are in line of sight of the GPS receiver 100 by multiplying a frequency domain representation of the Doppler shifted data with a frequency domain representation of a replica C/A code. The result of the multiplication is provided to the IFFT processing unit 114. The IFFT processing unit 114 converts the result of the multiplication into the time domain. The result of IFFT processing can be a vector with a series of elements, where each element comprises a correlation value. The correlation values are a measure of similarity and indicate whether there is a match between the replica C/A code and the C/A code transmitted by a satellite.

At stage E, the peak detection unit 116 receives the output of the IFFT processing unit 114 and identifies an element with the highest correlation value. The value of the peak and position of the element in the vector comprising the peak value can be used to identify the position of the satellite, satellite timing information, etc. The acquisition unit 106 can perform the above-described operations on the same received RF signal to identify each of the satellites that are in line of sight and transmitting to the GPS receiver 100 by generating and using a different C/A code at stage C. The acquisition unit 106 provides information about the satellite (e.g., current Doppler frequency and code phase of the satellite, etc.) to the tracking unit 108. The tracking unit 108 can track the acquired satellites to continuously provide location information. Additionally, the GPS receiver 100 may also comprise a position calculation unit (not shown). The position calculation unit may receive position information from four or more satellites and use triangulation to determine the position of the GPS receiver 100. The position calculation unit may also be used to calculate distance and directions to other locations and perform other functions commonly provided by satellite navigation systems. A detailed description of one example of the acquisition unit 106 is described with reference to FIG. 2.

Figure 2:
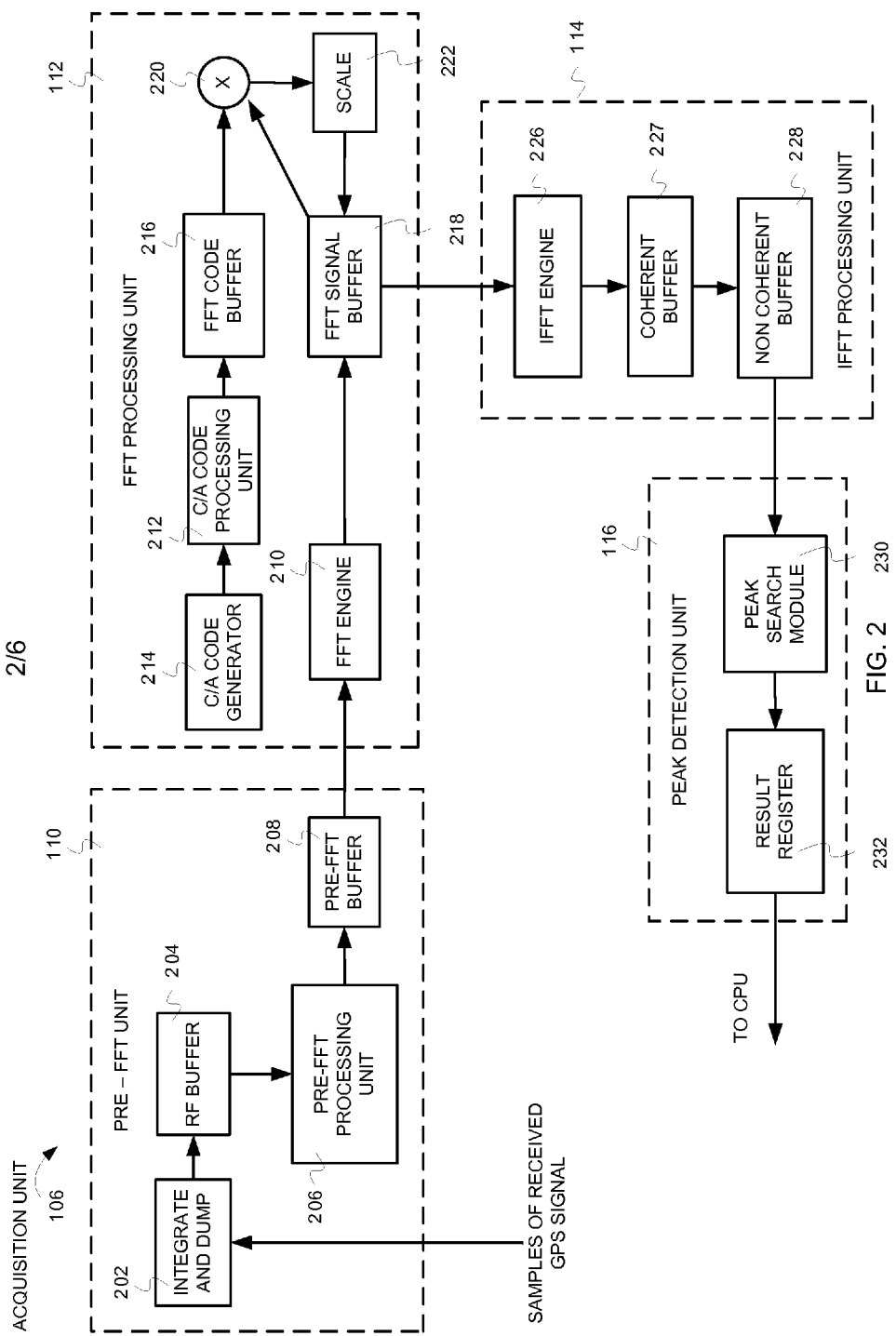
FIG. 2 is an example block diagram of an FFT based GPS acquisition unit.

FIG. 2 is an example block diagram of an FFT based GPS acquisition unit. FIG. 2 depicts one embodiment of the acquisition unit 106 comprising the pre-FFT unit 110, the FFT processing unit 112, the IFFT processing unit 114, and the peak detection unit 116.

The pre-FFT unit 110 comprises an integrate-and-dump unit 202, an RF buffer 204, a pre-FFT processing unit 206, and a pre-FFT buffer 208. The output of the pre-FFT buffer 208 is fed into an FFT engine 210 in the FFT processing unit 112. In the FFT processing unit 112, the FFT engine 210 is coupled to an FFT signal buffer 218. Also, a C/A code generator 214 is connected to a C/A code processing unit 212 which, in turn, is connected to an FFT code buffer 216. The content of the FFT signal buffer 218 and the FFT code buffer 216 are fed as inputs to a complex multiplier 220. A scaling unit 222 is coupled to the complex multiplier 220 and scales the output of the complex multiplier 220. The scaling unit 222 is also coupled to the FFT signal buffer 218. The FFT signal buffer 218 is coupled to an IFFT engine 226 in the IFFT processing unit 114. In the IFFT processing unit 114, the IFFT engine 226 is coupled to a coherent buffer 227, which is further coupled to a non-coherent buffer 228. The output of the non-coherent buffer 228 is coupled to the peak detection unit 116. The peak detection unit 116 comprises a peak search module 230 and a result register 232.

The integrate-and-dump unit 202 receives samples of a received RF signal ("input samples") from an RF front end (e.g., the RF front end 104 of FIG. 1). The received RF signal can comprise a combination of signals transmitted by a plurality of satellites. The frequency of the input samples received by the integrate-and-dump unit 202 is typically higher than the frequency that can be processed by the GPS receiver. In some implementations, the integrate-and-dump unit 202 decimates the input samples (while preserving the information in the input samples) so that the frequency of the samples provided to other processing units in the GPS receiver is less than or equal to half the frequency of the input samples. For example, if the frequency of the input samples is 16 MHz, the integrate-and-dump unit 202 may reduce the frequency at its output to 8 MHz or even 4 MHz. In some implementations, the frequency of the input samples can be as high as 32 MHz or even 64 MHz. Eq. 1 represents an equation for the integrate-and-dump unit 202.

$$y_{ID}(k) = \sum_{i=o}^{N-1} x_{in}(k \cdot N + i) \qquad \text{Eq. 1}$$

In Eq. 1, $y_{ID}(k)$ refers to the result of the integrate-and-dump operation and comprises the samples that are stored in the RF buffer 204, $x_{in}(k)$ comprise the input samples, i is a counter and can depend on how many sets of input samples are to be processed and stored in the RF buffer, N represents the number of input samples in each integration. As depicted in Eq. 1, the integrate-and-dump unit 202 integrates the input samples over the integration time interval and outputs the result at the desired sampling frequency. In one implementation, the input sample rate is 16 MHz, N=4 and the output is sampled at 4 MHz. The samples obtained as a result of the integrate-and-dump operation are stored in the RF buffer 204. In one implementation, the RF buffer 204 can be a 96 kB buffer. The RF buffer 204 can store 4 kB of samples per one millisecond and can hold samples for 24 milliseconds of data. However, in other implementations, the size of the RF buffer 204, the number of samples stored in the RF buffer 204, and a format in which the samples are stored can vary.

In some implementations, the RF buffer 204 may be a circular buffer. In other words, when a current sample is written into the end of the RF buffer 204, a next sample will be written into the beginning of the RF buffer 204, and start to propagate toward the end of the RF buffer 204. As each sample exists in the RF buffer 204 for the duration of the buffer length, previously written samples will be continuously overwritten by new samples. The length of the RF buffer 204 should be chosen to balance the memory size and processing capability.

After the RF buffer 204 is filled, the pre-FFT processing unit 206 reads the data from the RF buffer 204 using a decimator, rotates the data to remove Doppler shift, sums the samples to generate the requisite amount of data for processing, and writes the pre-summed data to the pre-FFT buffer 208. In one implementation, the decimator can be a 2-1 decimator and may be driven by a numerically controller oscillator (NCO). Also, the pre-FFT buffer 208 may be designed to hold one millisecond of data and therefore, the pre-FFT processing unit 206 may sum the rotated samples to generate one millisecond of pre-summed data. In one example, the pre-FFT processing unit 206 may retrieve samples over a first millisecond of data, shift the samples to compensate for the Doppler shift, and store the samples in the pre-FFT buffer 208. The pre-FFT processing unit 206 may then retrieve samples over a second millisecond of data from the RF buffer 204, shift the samples to compensate for the Doppler shift, add the Doppler shifted samples of the second millisecond of data to previous content of the pre-FFT buffer 208, and store the result in the pre-FFT buffer 208.

It is noted, however, that in other implementations the pre-FFT buffer 208 may be designed to hold more or less than one millisecond of pre-summed data. In some implementations, the pre-FFT buffer 208 and the RF buffer 204 may be implemented as contiguous memory blocks and may be programmatically controlled. The pre-summed data may also be reordered before the pre-summed data is written into the pre-FFT buffer 208. Reordering the data ensures that the FFT engine 210 can perform FFT operations with a minimum number of read operations. The pre-summed data is reordered such that the FFT engine 210 can retrieve and perform FFT on consecutive samples without having to scan through all of the pre-summed data to retrieve the requisite samples.

The FFT engine 210 retrieves the pre-summed data from the pre-FFT buffer 208 and performs a Fast Fourier Transformation on the pre-summed data to generate a frequency domain representation of the pre-summed data ("frequency domain data"). In one implementation, the FFT engine 210 may perform a 2048-point FFT on the pre-summed data. In another implementation, the FFT engine 210 may perform a 1024-point or N-point FFT, wherein N is any suitable number and preferably a power of the FFT radix. The frequency domain data is stored in the FFT signal buffer 218.

The coarse acquisition (C/A) code generator 214 generates a C/A code ("replica C/A code") for one of the satellites in the satellite system. In one implementation, the C/A code may be a Gold Code. Typically, the length of the C/A code is 1023 bits. To perform a 2048-point FFT on the replica C/A code, in one implementation, the C/A code processing unit 212 can oversample the replica C/A code (i.e., sampling the C/A code at twice the sampling rate) making the C/A code 2046 samples long. Furthermore, in one implementation, the C/A code processing unit 212 can pad two zeros to the 2046-sample C/A code to perform a 2048-point FFT. The two zeros may be padded such that they are equally spaced from each other. For example, one of the zeros may be inserted in the middle of the replica C/A code and the other zero may be inserted at the end of the replica C/A code. It should, however, be noted that the rate of oversampling and the subsequent length of the replica C/A code depend on the length of the frequency domain data samples. The C/A code processing unit 212 converts the replica C/A code into its frequency domain representation. The frequency domain representation of the C/A code ("frequency domain code") is stored in the FFT code buffer 216. The frequency domain data and the frequency domain code from the FFT signal buffer 218 and the FFT code buffer 216, respectively, are multiplied using the complex multiplier 220. This is equivalent to performing a time domain convolution of the pre-summed data (from the pre-FFT buffer 208) and the replica C/A code. The scaling unit 222 scales the output of the complex multiplier 220 and stores the scaled output in the FFT signal buffer 218. The scaled output may also be reordered before being stored in the FFT signal buffer 218 to minimize a number of read operations required for performing IFFT operations.

The IFFT engine 226 reads the scaled output from the FFT signal buffer 218 and performs inverse fast Fourier transform (IFFT) operations on the scaled output of the complex multiplier 220. In one implementation, the IFFT operations produce a vector comprising a series of bins, where each bin comprises a correlation value. For a 2048-point IFFT, the IFFT engine 226 returns a vector with 2048 bins. The correlation values in the bins indicate a level of correlation between the replica C/A code and a C/A code transmitted by the satellite. The higher the correlation value, the stronger correlation between the two C/A codes. Typically, most of the correlation values in the bins have a zero or negligible value, while only a few bins have a high correlation value. For example, in an IFFT vector with 2048 bins, four bins might have a high correlation value, while the remaining bins may have a zero value. The correlation values quantitatively represent where in time the C/A code signals are correlated (i.e., high correlation values), a degree to which the signals are correlated, and where the signals are not correlated (i.e., zero or negligible correlation values). The IFFT engine 226 stores the result of the IFFT operations in the coherent buffer 227, and data in the coherent buffer 227 can be further accumulated before being stored in the non-coherent buffer 228. For instance, in one example, the required coherent integration time may be 20 milliseconds, and the number of non-coherent integration rounds may be 100. To avoid using a very long RF buffer, 10 milliseconds of data from the pre-FFT buffer 208 can be accumulated coherently and two sets of 10 milliseconds of IFFT results can be accumulated coherently in the coherent buffer 227. Then, the magnitude of the result in the coherent buffer 227 can be stored in the non-coherent buffer 228. In one example, the above-described process can be repeated 100 times to obtain 100 rounds of non-coherent integration.

The peak search module 230 searches through the non-coherent buffer 228 to identify bins with high correlation values. In one implementation, the peak search module 230 may successively compare the correlation value in each bin and identify a bin with the peak correlation value. The peak search module 230 records details of the identified correlation peak in the results register 232. For example, the peak search module may indicate a location of the identified correlation peak (e.g., bin 12), a total number of bins (e.g., 2048 bins), the correlation value in the identified bin, etc. A processing unit (not shown) can retrieve information about the identified correlation peak from the results register 234 and use the information to calculate satellite Doppler and timing.

It should be noted that the operations described with reference to FIGS. 1-2 are examples. In one implementation, the frequency domain representation of the pre-summed data may be reordered before complex multiplication. Also, the frequency domain representation of the C/A code may be conjugated before it is multiplied with the frequency domain representation of the pre-summed data.

Furthermore, it is noted that in various implementations the FFT processing can be done at a much higher speed than the data rate in the RF buffer 204. In other words, a data rate at which the samples are retrieved from the RF buffer ("output data rate") for further processing (e.g., compensating by Doppler shift, FFT calculation, etc.) may be much higher than an input data rate of the input samples stored in the RF buffer 204. Thus, multiple searches (with different C/A code and/or different Doppler bin) can be performed with the same stored data samples in the RF buffer 204. In other words, a segment of data in the RF buffer 204 can be played back, at high speed, many times to perform parallel searches before it is overwritten by new data samples. In some implementations, various instances of the segment of data in the RF buffer 204 can be created by shifting the segment of data in the RF buffer 204 by different values of Doppler shift. The various instances of the shifted segment of data in the RF buffer 204 can be correlated (e.g., multiplying frequency domain representations of the C/A code, and the shifted segment of the data, performing IFFT operations, etc.) with the C/A code to determine information about the satellite associated with the C/A code. Operations for correlating the C/A code with the various instances of the shifted segment of data in the RF buffer 204 can be performed successively or in parallel. In one implementation, parallel processing over a frequency space (e.g., over different values of Doppler shift) can enhance search capabilities. It should also be noted that after the segment of data is overwritten by the new data samples, a next segment of data in the RF buffer may be processed in a similar fashion.

Figure 3:
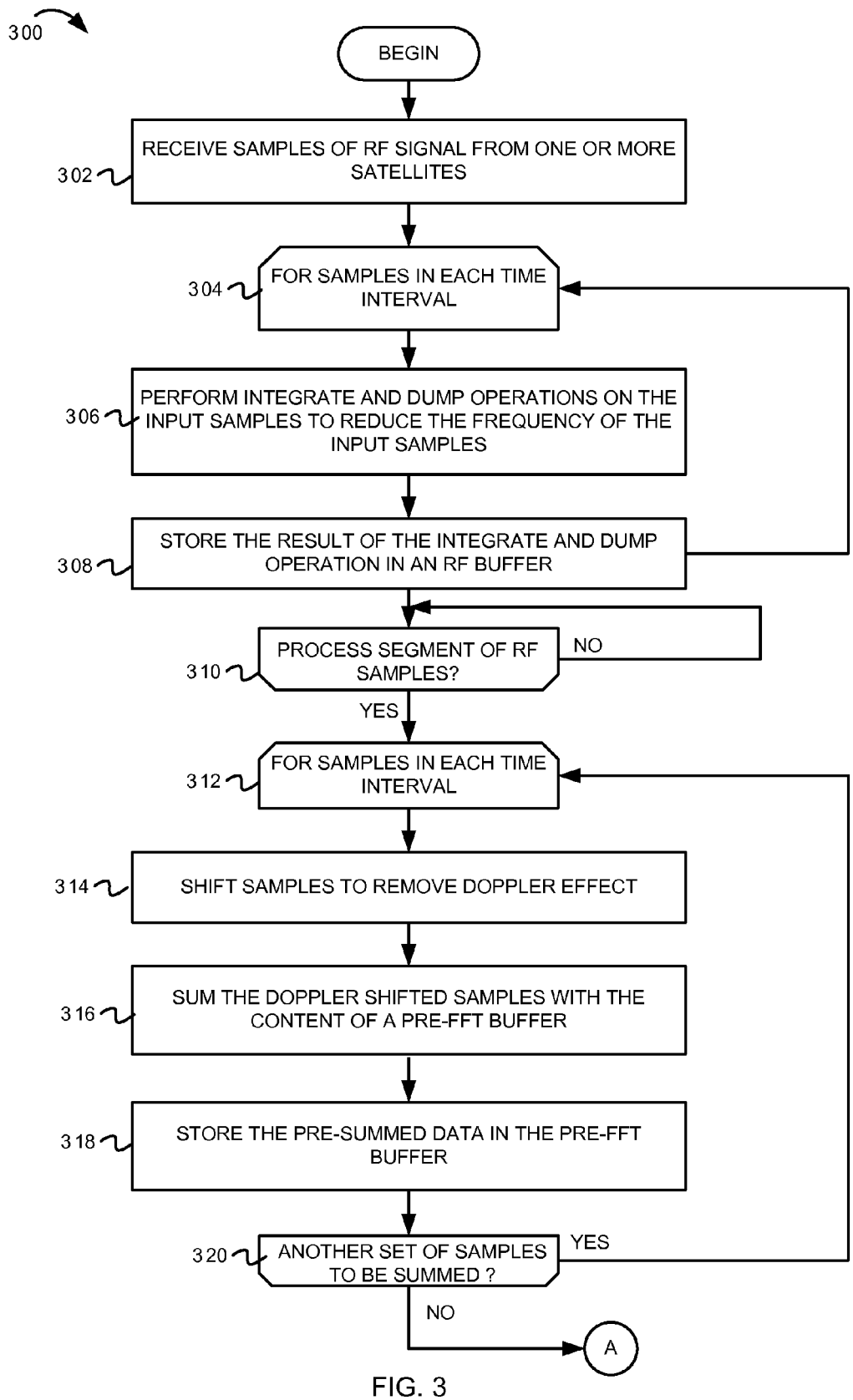
FIG. 3 is a flow diagram illustrating example operations for performing FFT based acquisition.

FIG. 3 is a flow diagram illustrating example operations for performing FFT based acquisition. Flow 300 begins at block 302.

At block 302, samples of an RF signal from one or more satellites are received. In one implementation, the RF signal may be a combination of signals from satellites in a GPS satellite navigation system. In another implementation, the RF signal may be a combination of signals received from multiple satellite sources (e.g., a combination of GPS satellite signals and GLONASS satellite signals). The received RF signal is processed and digitized to generate samples of the received RF signal. The flow continues at block 304.

At block 304, a loop is begun to perform a set of operations (blocks 306 and 308) for each set of samples in a defined time interval. In some implementations, the time interval may be determined by the processing speed of components in a GPS receiver (e.g., the GPS receiver 100 of FIG. 1). In other implementations, the time interval may be pre-defined or dynamically determined based on, e.g., a signal to noise ratio. In one implementation, the set of operations may be performed for samples within a one-millisecond interval. In another implementation, the set of operations may be performed for samples within any suitable time interval. At block 304, it is also determined whether there exist another set of samples in a next time interval, which should be integrated and decimated to the desired frequency. A next set of samples is retrieved and the loop executes for the next set of samples. For each set of samples in the defined time interval, the flow continues at block 306.

At block 306, integrate-and-dump operations are performed on samples of the received RF signal ("input samples"). For example, the integrate-and-dump unit 202 of FIG. 2 performs the integrate-and-dump operations. The input samples are integrated and the result of the integration is sampled at the desired output frequency. This can result in a reduction in the frequency of the samples that are processed by the GPS receiver and a reduction in the number of samples that are processed, without losing any information in the input samples. The flow continues at block 308.

Figure 4:
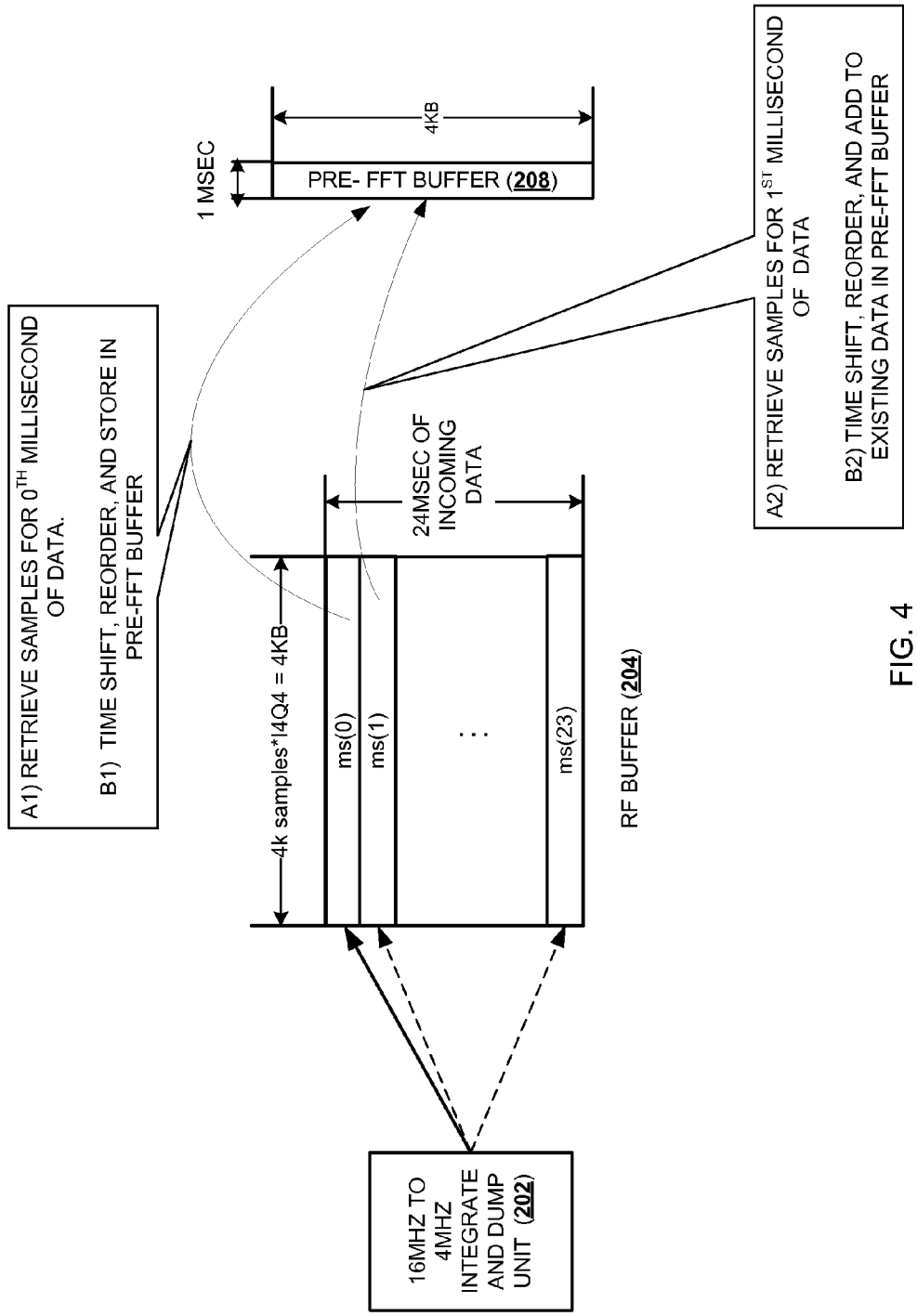
FIG. 4 is an example of one embodiment illustrating pre-FFT operations in an FFT acquisition unit.

At block 308, the result of the integrate-and-dump operation is stored in an RF buffer. The data in the RF buffer may be stored in the order in which it was processed. For example, referring to Eq. 1, with the integration time interval (N) of 4 samples, the samples generated from the first millisecond may be stored in a first row of the RF buffer. This is illustrated in the example of FIG. 4, where the integrate-and-dump unit 202 converts a 16 MHz sampled signal into a 4 MHz sampled signal. In one example, the integrate-and-dump unit 202 operates over 4 samples of data. As the integrate-and-dump unit 202 integrates the input samples and samples the integrated result to generate samples at a 4 MHz data rate, the generated samples are stored in the RF buffer 204. In the RF buffer 204, the samples generated from the first millisecond are stored in a first row (designated as ms (0)) of the RF buffer 204. Likewise, the samples generated from the second millisecond are stored in a second row (designated as ms (1)) of the RF buffer 204. In one example, the RF buffer 204 comprises memory space for samples across 24 milliseconds represented by rows. As depicted in FIG. 4, the samples may be stored in 14Q4 format. However, the samples may also be stored in an 18Q8 format or any suitable format. In one implementation, the RF buffer can comprise 4096 samples (i.e., 4k samples) for each millisecond of data. In other implementations, the RF buffer 204 may comprise memory space for 10 milliseconds of data or any suitable number of data samples. Referring back to FIG. 3, after the result of the integrate-and-dump operation is stored in the RF buffer, the flow continues at block 310. Additionally, because in some embodiments the RF buffer may be a circular buffer, a next set of samples may also be continuously received and written into the RF buffer, as indicated by a line of flow from block 308 to block 304.

At block 310, it is determined whether a segment of the RF samples should be processed. It may be determined whether a requisite number of RF samples have been stored in the RF buffer. It may also be determined whether a signal to noise ratio (SNR) of the segment of RF samples is greater than a threshold SNR value. If it is determined that the segment of RF samples is ready to be processed, the processing starts at block 312. Otherwise, the flow loops back to block 310 where the flow 300 waits until the segment of RF samples is ready for processing. Meanwhile, the input samples corresponding to the next interval of time are retrieved, integrated, sampled, and stored in the RF buffer without interruption (blocks 302-308).

At block 312, a loop is begun to perform a set of operations (blocks 314-318) for each set of samples corresponding to a time interval. In one implementation, the time interval may be equal to the time interval determined at block 304. The time interval may depend on the signal to noise ratio of the signal, the size of the pre-FFT buffer, etc. At block 312, it is also determined whether there exist another set of samples, in a next time interval, which should be time shifted, reordered, and summed in preparation for FFT operations. A next set of samples is retrieved and the loop executes for the next set of samples. For each set of samples in the time interval, the flow continues at block 314.

At block 314, the set of samples corresponding to the interval of time are shifted to remove the Doppler shift to yield the Doppler shifted samples. For example, the pre-FFT processing unit 206 of FIG. 2 may rotate the samples to remove the effects of the Doppler shift. The Doppler shift is a time shift and can depend on the orbital velocity of the satellite, rotational velocity of the earth, and speed of the receiver (e.g., speed of a car in which the GPS receiver is located). Compensating for the Doppler shift allows the GPS receiver to get a better estimate of the position and velocity of the GPS receiver. In one implementation, the samples may be further decimated (e.g., by a 2-1 decimator) before being time-shifted. The flow continues at block 316.

At block 316, the Doppler shifted samples are summed with previous content of the pre-FFT buffer (e.g., the pre-FFT buffer 208 of FIG. 2). In one implementation, the pre-FFT buffer may initially be empty (i.e., comprise zero value). The Doppler shifted samples at the first sample instant may be stored in the pre-FFT buffer. At a second iteration, the Doppler shifted samples at the second sample instant may be added to the Doppler shifted samples at the first sample instant stored in the pre-FFT buffer. The result of summing the Doppler shifted samples at the first and second sample instants may also be stored in the pre-FFT buffer. This process may continue until all the samples in the RF buffer have been summed into the pre-FFT buffer. In some implementations, only a portion of the RF buffer may be retrieved and summed into the pre-FFT buffer. The portion of the RF buffer that is processed can be pre-defined and/or programmable. In one example, the samples may be pre-summed and stored in the pre-FFT buffer until the pre-FFT buffer comprises 10 milliseconds of data. The pre-summed data in the pre-FFT buffer may be processed and then cleared before a next set of samples is retrieved, time-shifted and summed. In another implementation, the pre-FFT buffer may not be cleared every time the pre-summed data in the pre-FFT buffer is processed.

At block 318, the pre-summed data is stored in a pre-FFT buffer. The operations described with reference to blocks 314-318 are illustrated in the example of FIG. 4. Referring to FIG. 4, at stage A1, the samples corresponding to $0^{th}$ millisecond in the RF buffer are retrieved. At stage B1, the retrieved samples are time shifted, pre-summed, reordered, and stored in the pre-FFT buffer 208. Stage B1 represents one example of the loop operations (blocks 314-318). Referring back to FIG. 3, the flow continues at block 320.

At block 320, the loop for each set of samples corresponding to the time interval ends. At block 320, it is determined whether there exists another set of samples to be summed. It may be determined whether a desired number of sets of samples to be summed into the pre-FFT buffer is reached. In some implementations, the entire content of the RF buffer (e.g., 24 milliseconds of data) may be summed into the pre-FFT buffer (e.g., 1 millisecond of data). In another implementation, loop operations (blocks 314-318) may be performed until a signal to noise ratio for the pre-summed data is above a threshold value. If it is determined that there exists another set of samples to be summed into the pre-FFT buffer, the flow loops back to block 312 where samples corresponding to the next time interval sample instant are retrieved, time-shifted, summed, and stored in the pre-FFT buffer. Referring to FIG. 4, stages A2-B2 represent example operations performed on the samples in the next time interval. At stage A2, the samples corresponding to the $1^{st}$ millisecond from the RF buffer comprising 24 milliseconds of data is retrieved. At stage B2, the retrieved samples are shifted in time to compensate for the Doppler shift, pre-summed, reordered, and added to existing data in the pre-FFT buffer 208. Referring to FIG. 3, if it is determined that there does not exist another set of samples to be summed, the flow continues at block 322 in FIG. 5.

Figure 5:
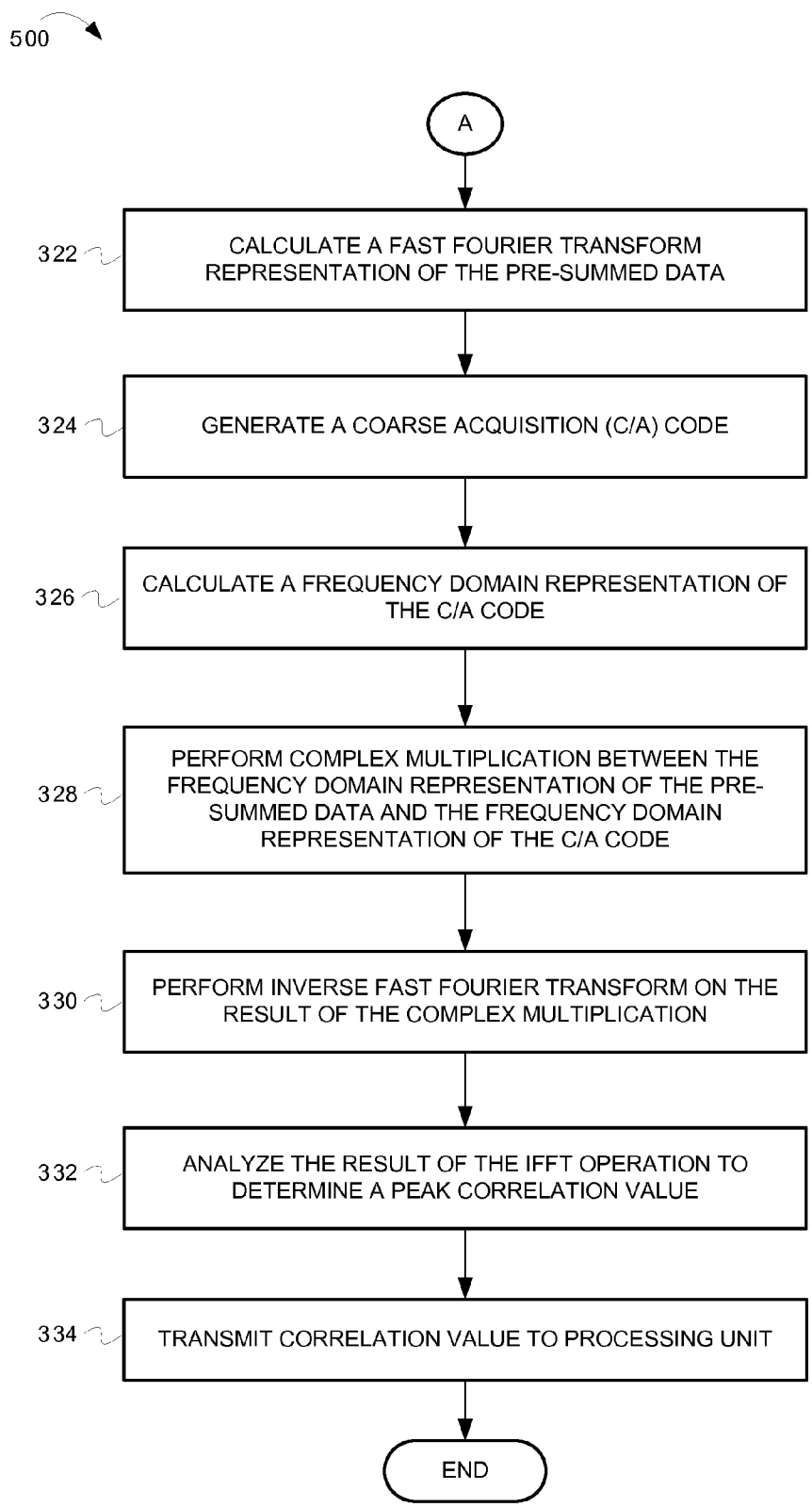
FIG. 5 is a flow diagram illustrating example operations for performing FFT based acquisition.

FIG. 5 is a flow diagram illustrating example operations for performing FFT based acquisition. Flow 500 begins at block 322 and may be a continuation of flow 300 of FIG. 3.

At block 322, a fast Fourier transform (FFT) of the pre-summed data (e.g. described in FIG. 3) is calculated to generate a frequency domain representation of the pre-summed data ("frequency domain data"). For example, the FFT engine 210 of FIG. 2 can calculate the frequency domain representation of the pre-summed data. In one implementation, zeros may be inserted into the pre-summed data such that the length of the pre-summed data after inserting the zeros is a next highest power of 2. For example, 2046 samples of the summed data may be used to perform a 2048-point FFT after padding two zeros. In another implementation, any suitable number of samples (not necessarily equal to a power of 2) maybe used to perform the FFT. In one implementation, the FFT engine 210 processes pre-summed data obtained from the pre-FFT unit 110 of FIG. 2. The flow continues at block 324.

At block 324, a replica coarse acquisition (C/A) code is generated. For example, the C/A code generator 214 of FIG. 2 may generate the replica C/A code. The replica C/A code corresponds to a unique C/A code associated with one of the satellites in the satellite navigation system. The flow continues at block 326.

At block 326, a frequency domain representation of the replica C/A code is calculated. For example, the C/A code processing unit 212 of FIG. 2 may calculate the frequency domain representation of the replica C/A code. Prior to calculating the frequency domain representation of the replica C/A code, samples of the replica C/A code may be reordered to minimize a number of read operations that are executed for performing FFT operations on the replica C/A code. Calculating the frequency domain representation of the replica C/A code involves performing a fast Fourier transform on the replica C/A code. In some implementations, the number of samples required for calculating the frequency domain representation of the replica C/A code should equal the number of samples used to calculate the frequency domain representation of the pre-summed data (at block 322). In other words, if a 2048-point FFT of the pre-summed data was calculated at block 322, a 2048-point FFT of the replica C/A code should also be calculated. However, the length of the replica C/A code is 1023 bits (by default), while the length of pre-summed data is typically a power of 2 (e.g., 1024 samples, 2048 samples, etc.) Therefore, in some implementations, the C/A code processing unit 212 pads the replica C/A code (i.e., zeros are added to the C/A code) so that the length of the replica C/A code equals the length of the pre-summed samples. Padding the replica C/A code so that the length of the C/A code and the length of pre-summed samples is a power of 2 can improve hardware efficiency associated with implementing FFT. However, in some implementations, the length of the C/A code and the length of pre-summed samples need not be a power of 2 and may be any suitable length. Inserting zeros in an appropriate position (as will be described below), can also reduce SNR loss when the uncertainty of the code phase is less than the full code length (e.g. in a hot start scenario).

As an example, to perform a 1024-point FFT, a single zero may be padded as the last sample of the replica C/A code. In another implementation, the zero may be padded as a sample in the middle of the replica C/A code. As another example, to perform a 2048-point FFT on the replica C/A code, the 1023-bit long replica C/A code may be oversampled to yield 2046 samples and the zeros may be padded in the center and at the end of the replica C/A code. In another implementation, the zeros can be added at any position in the replica C/A code with a space of 1024 samples. The flow continues at block 328.

At block 328, a complex multiplication between the frequency domain representation of the replica C/A code and the frequency domain representation of the pre-summed data is performed. For example, the complex multiplier 220 of FIG. 2 may multiply the frequency domain representations of the replica C/A code and the pre-summed data. In one implementation, the result of multiplying the frequency domain representations of the replica C/A code and the pre-summed data ("multiplication result") may be scaled by a constant scale factor for convenient storage in a storage buffer. In other implementations, the multiplication result may be normalized based on the size of the storage buffer. In some implementations, the multiplication result may be stored in the storage buffer along with a fixed exponent value. In some implementations, the multiplication result may be reordered to minimize a number of read operations that are executed for performing IFFT operations on the multiplication result. The flow continues at block 330.

At block 330, an inverse fast Fourier transform (IFFT) is performed on the multiplication result. For example, the IFFT engine 226 of FIG. 2 may perform IFFT operations on the multiplication result. The IFFT operations result in a vector comprising a series of bins. For example, a 2048-point IFFT can result in a vector with 2048 bins. Each of the bins comprises a correlation value. The correlation value indicates a degree of correlation between the replica C/A code and the C/A code transmitted by the satellite (represented by the pre-summed data). The correlation values quantitatively represent where in time the replica and the satellite C/A codes are correlated (i.e., high correlation values), how much the C/A codes are correlated, and where the replica and the satellite C/A codes are not correlated (i.e., zero or negligible correlation values). The flow continues at block 332.

At block 332, the result of the IFFT operations is analyzed to determine a peak correlation value. For example, the peak search module 230 of FIG. 2 may analyze the correlation values in the bins produced as a result of the IFFT operations. In one implementation, the correlation value in a first bin may be compared with a correlation value in a second bin. The higher of the two correlation values may be stored and compared with a correlation value in a third bin. The process of comparing correlation values may be continued until the peak correlation value is identified. In another implementation, a set of correlation values above a threshold value may be identified. The flow continues at block 334.

At block 334, information about the correlation peak is transmitted to a processing unit. For example, the peak detection unit 230 of FIG. 2 may transmit the information about the correlation peak to a central processing unit (CPU) on the GPS receiver 100. The information about the correlation peak can comprise a value of the correlation peak, a position (e.g., bin number, element number, etc.) of the correlation peak, a total number of bins, etc. The processing unit can use the information about the correlation peak value to calculate a position and timing of the satellite. From block 334, the flow ends.

It should be noted that the operations described in the flow diagrams (FIGS. 3-5) are examples meant to aid in understanding embodiments, and should not be used to limit embodiments or limit scope of the claims. Embodiments may perform additional operations, fewer operations, operations in a different order, operations in parallel, and some operations differently. For example, the pre-summed data in the pre-FFT buffer 208 can be used to search for other satellites (i.e., other C/A codes in a code space). After the information about the correlation peak (determined at block 334) is stored, the C/A code generator 214 can generate a next C/A code, and perform operations described with reference to blocks 324-334 to identify peak correlation values for the next C/A code. This process can be repeated for a set of known C/A codes (e.g., the C/A codes for satellites in the satellite navigation system) and information about correlation peaks for each of the C/A codes can be stored.

The data in the RF buffer 204 can also be used to search for frequency offsets (e.g., in a frequency space). As described with reference to block 314, the samples from the RF buffer 204 are shifted in time to remove the effect of Doppler shift. The pre-summed data in the pre-FFT buffer 208 reflects the Doppler shift. Because the exact speed of the satellite in space is unknown, an approximate value of the Doppler shift can be estimated. The samples from the RF buffer 204 can be integrated and sampled at a different rate to accurately determine the frequency offset and the code phase of the satellite. For example, a Doppler shift of 500 Hz may be assumed, the samples from the RF buffer 204 may be shifted (e.g., by 500 Hz), and the Doppler shifted samples may be stored in the pre-FFT buffer 208. After searching through the code space, and storing the information about correlation peaks for each of the C/A codes, the pre-FFT buffer 208 may be cleared. A new Doppler offset may be selected, the data in the RF buffer 204 can be shifted by the new Doppler offset, and the set of operations described with reference to blocks 312-334 may be performed for the C/A codes in the code space. In some implementations, the pre-FFT buffer 208 as well as the RF buffer 204 may be cleared, a new set of input samples may be retrieved, and operations described in flow 300 may be performed across the code space and the frequency space.

Additionally, the IFFT results for a particular C/A code may be accumulated over different time instants. In other words, the IFFT results for a first C/A code and with a Doppler shift of e.g., 500 Hz may be stored in a non-coherent buffer. At a next iteration, IFFT results for the first C/A code and with a Doppler shift of 500 Hz may be accumulated with the previous content of the non-coherent buffer. This process may be repeated over a series of Doppler shifts. This process can reduce the effects of noise on the correlation values and may generate a significant correlation peak (i.e., a single bin with a high correlation value). The operations for identifying peak values and transmitting information about the correlation peak to the processing unit (i.e., blocks 332 and 334) may be performed after the IFFT results for the particular C/A code are accumulated.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 6:
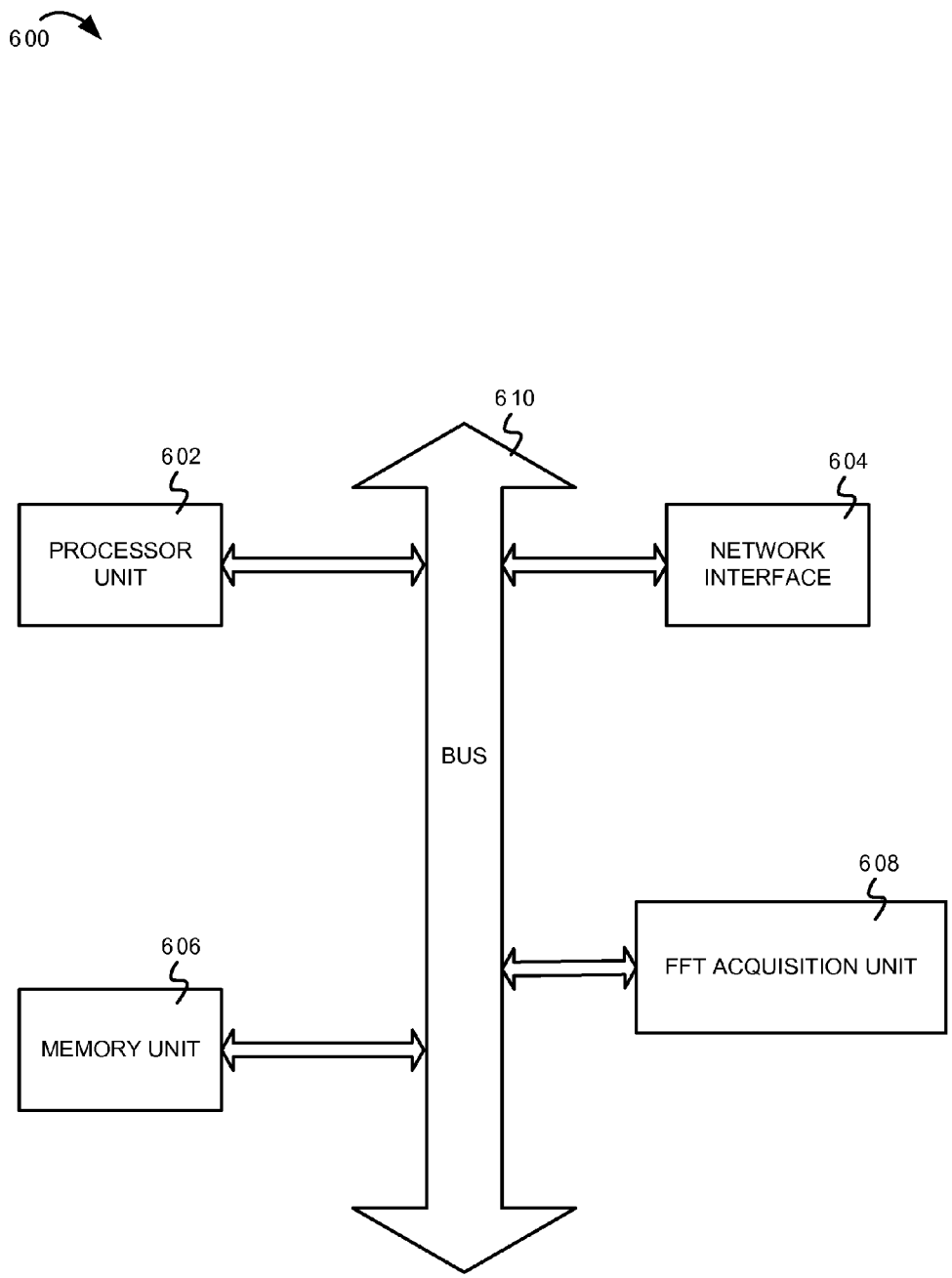
FIG. 6 is a block diagram of one embodiment of a wireless device configured to perform FFT-based satellite acquisition.

FIG. 6 is a block diagram of one embodiment of a wireless device configured to perform FFT-based satellite acquisition. In one implementation, the wireless device can be a GPS receiver 600. The GPS receiver 600 includes a processor unit 602 (possibly including multiple processors, multiple cores, multiple nodes, and/or implementing multi-threading, etc.). The GPS receiver 600 includes a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The GPS receiver 600 also includes a bus 610 (e.g., PCI, ISA, PCI-Express, HyperTransport®, InfiniBand®, NuBus, etc.), and network interfaces 604 that include at least one wireless network interface (e.g., a WLAN interface, a Bluetooth® interface, a WiMAX interface, a ZigBee® interface, a Wireless USB interface, etc.). The GPS receiver 600 also includes a GPS acquisition unit 632. The acquisition unit 632 implements functionality for satellite acquisition using Fast Fourier Transforms as described above with reference to FIGS. 1-5. Any one of the above-described functionalities may be partially (or entirely) implemented in hardware and/or on the processing unit 602. For example, the functionality may be implemented with an application specific integrated circuit, in logic implemented in the processing unit 602, in a co-processor on a peripheral device or card, etc. In some implementations, hardware components of the GPS acquisition unit 632 may be configured to access the data in the memory unit 606 (e.g., in a direct memory access (DMA) fashion) using a linked list, array of structures, etc. In other implementations, the processor unit 602 may control the operations of the hardware components. Further, realizations may include fewer or additional components not illustrated in FIG. 6 (e.g., additional network interfaces, peripheral devices, etc.). The processor unit 602 and the network interfaces 604 are coupled to the bus 610. Although illustrated as being coupled to the bus 610, the memory 606 may be coupled to the processor unit 602.

It should also be noted that in some implementations, the GPS receiver 600 might be connected to various other applications and external devices (e.g., an application processor and memory). In one implementations, various components of the GPS acquisition unit 632 (e.g., the RF buffer 204 of FIG. 2, the coherent buffer 227, the non-coherent buffer 228, etc.) in the GPS receiver 600 may be offloaded to and implemented on the external device(s) to reduce the footprint of the GPS receiver 600. The GPS acquisition unit 632 may access data offloaded to the external device(s) via a high-speed bus.

While the embodiments are described with reference to various implementations and exploitations, it will be understood that these embodiments are illustrative and that the scope of the inventive subject matter is not limited to them. In general, search techniques for global position systems (GPS) using Fast Fourier Transforms (FFT) as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    receiving, using a satellite navigation receiver, input samples of an RF signal from one or more satellites of a plurality of satellites in a satellite navigation system, wherein the RF signal is a combination of signals from the one or more satellites of the satellite navigation system;
    compensating, using the satellite navigation receiver, for Doppler shift in a first set of the input samples to yield a compensated first set of samples, wherein the first set of the input samples correspond to the input samples received within a first time interval;
    calculating, using the satellite navigation receiver, a frequency domain representation of the compensated first set of samples;
    generating, using the satellite navigation receiver, a coarse acquisition code associated with at least one of the plurality of satellites in the satellite navigation system;
    inserting, using the satellite navigation receiver, a first zero into the coarse acquisition code as a center bit and inserting a second zero into the coarse acquisition code as an end bit such that a length of the coarse acquisition code equals a pre-defined length;
    calculating, using the satellite navigation receiver, a frequency domain representation of the coarse acquisition code of the pre-defined length for determining whether the RF signal was transmitted by the at least one of the plurality of satellites;

determining, using the satellite navigation receiver, a time domain representation of a result of multiplying the frequency domain representation of the compensated first set of samples and the frequency domain representation of the coarse acquisition code;

identifying, using the satellite navigation receiver, a peak correlation value from the time domain representation; and determining, using the satellite navigation receiver, information about the at least one of the plurality of satellites based on the peak correlation value.

2. The method of claim 1, wherein the pre-defined length is a length of the compensated first set of samples.

3. The method of claim 1, wherein the pre-defined length is a power of 2.

4. The method of claim 1, wherein said inserting the first zero into the coarse acquisition code as the center bit and inserting the second zero into the coarse acquisition code as the end bit comprises inserting the first zero and the second zero into the coarse acquisition code such that a spacing between the first inserted zero and the second inserted zero is a predetermined number of samples.

5. The method of claim 4, wherein the spacing between the first inserted zero and the second inserted zero is 1024 samples.

6. The method of claim 1, wherein said calculating the frequency domain representation of the compensated first set of samples further comprises inserting zeros into the compensated first set of samples such that a length of the compensated first set of samples equals a pre-defined length.

7. The method of claim 6, wherein the pre-defined length is a power of 2.

8. The method of claim 1, further comprising:
calculating a frequency domain representation of a coarse acquisition code of a second of the plurality of satellites for determining whether the RF signal was transmitted by at least the second of the plurality of satellites;
determining a second time domain representation of a result of multiplying the frequency domain representation of the compensated first set of samples and the frequency domain representation of the coarse acquisition code of the second of the plurality of satellites;
identifying a second peak correlation value from the second time domain representation; and
determining information about the second of the plurality of satellites based on the second peak correlation value.

9. The method of claim 1, further comprising:
compensating for the Doppler shift in a second set of the input samples to yield a compensated second set of samples, wherein the second set of the input samples correspond to the input samples received within a second time interval;
summing the compensated first set of samples with the compensated second set of samples to yield a pre-summed set of samples and to improve signal to noise ratio of the pre-summed set of samples;
calculating a frequency domain representation of the pre-summed set of samples;
determining a second time domain representation of a result of multiplying the frequency domain representation of the pre-summed set of samples and the frequency domain representation of the coarse acquisition code;
identifying a second peak correlation value from the second time domain representation; and
determining the information about the at least one of the plurality of satellites based on the second peak correlation value.

10. The method of claim 1, wherein the compensating for the Doppler shift in the first set of the input samples further comprises:
calculating an estimated value of the Doppler shift; and
compensating for the Doppler shift by shifting the first set of the input samples by the estimated value of the Doppler shift.

11. The method of claim 10, further comprising:
calculating, after searching through code space of the plurality of satellites in the satellite navigation system using the first set of the input samples shifted by the estimated value of the first Doppler shift, an estimated value of a second Doppler shift;
compensating for the second Doppler shift by shifting the first set of the input samples by the estimated value of the second Doppler shift; and
searching through code space of the plurality of satellites in the satellite navigation system using the first set of the input samples shifted by the estimated value of the second Doppler shift.

12. The method of claim 1, further comprising determining whether the first set of the input samples is available for processing by determining whether a signal to noise ratio of the first set of the input samples is greater than a threshold signal to noise ratio.

13. The method of claim 1, further comprising:
calculating a second time domain representation of a result of multiplying the frequency domain representation of a compensated second set of samples and the frequency domain representation of the coarse acquisition code associated with the at least one of the plurality of satellites, wherein the compensated second set of samples correspond to the input samples received within a second time interval and compensated for the Doppler shift;
accumulating the first time domain representation with the second time domain representation to improve a signal to noise ratio and generate a significant peak correlation value; and
identifying the peak correlation value from said accumulating the first time domain representation with the second time domain representation.

14. The method of claim 1, further comprising:
compensating each of a plurality of instances of the first set of the input samples by a distinct Doppler shift; and
correlating the plurality of instances of the first set of the input samples and the coarse acquisition code associated with the at least one of the plurality of satellites to determine information about the at least one of the plurality of satellites.

15. A method comprising:
receiving, using a satellite navigation receiver, input samples of an RF signal from one or more satellites of a plurality of satellites in a satellite navigation system, wherein the RF signal is a combination of signals from the one or more satellites of the satellite navigation system;
generating, using the satellite navigation receiver, a coarse acquisition code associated with a first of the plurality of satellites in the satellite navigation system;
inserting, using the satellite navigation receiver, a first zero into the coarse acquisition code as a center bit and inserting a second zero into the coarse acquisition code as an end bit to generate a compensated coarse acquisition code such that a length of the coarse acquisition code equals a pre-defined length; and
correlating, using the satellite navigation receiver, a first set of input samples, which correspond to the input samples received within a first time interval, and the compensated coarse acquisition code to determine information about the first of the plurality of satellites.

16. The method of claim 15, further comprising inserting zeros into the first set of the input samples such that a length of the first set of the input samples equals the pre-defined length.

17. The method of claim 16, wherein the pre-defined length associated with the first set of the input samples and the compensated coarse acquisition code is a power of 2.

18. The method of claim 15, wherein said inserting the first zero into the coarse acquisition code as the center bit and inserting the second zero into the coarse acquisition code as the end bit comprises inserting the first zero and the second zero into the coarse acquisition code such that a spacing between the first inserted zero and the second inserted zero is a predetermined number of samples.

19. The method of claim 15, wherein said correlating the first set of input samples and the compensated coarse acquisition code to determine information about the first of the plurality of satellites further comprises:
calculating a frequency domain representation of the first set of the input samples;
calculating a frequency domain representation of the compensated coarse acquisition code for determining whether the RF signal was transmitted by at least the first of the plurality of satellites;
determining a time domain representation of a result of multiplying the frequency domain representation of the first set of the input samples and the frequency domain representation of the compensated coarse acquisition code;
identifying a peak correlation value from the time domain representation; and
determine information about the first of the plurality of satellites based on the peak correlation value.

20. The method of claim 15, wherein said determining information about the first of the plurality of the satellites based on the peak correlation value comprises determining at least one of a current Doppler frequency, a code phase of the first of the plurality of satellites, a position of the first of the plurality of satellites, and timing information about the first of the plurality of satellites.

21. A satellite navigation receiver comprising:
a pre-FFT unit operable to:
receive input samples of an RF signal from one or more satellites of a plurality of satellites in a satellite navigation system, wherein the RF signal is a combination of signals from the one or more satellites of the satellite navigation system;
compensate for Doppler shift in a first set of the input samples to yield a compensated first set of samples, wherein the first set of the input samples correspond to the input samples received within a first time interval;
an FFT engine operable to:
calculate a frequency domain representation of the compensated first set of samples;
a coarse acquisition code generator operable to:
generate a coarse acquisition code associated with at least one of the plurality of satellites in the satellite navigation system;
a coarse acquisition code processing unit operable to:
insert a first zero into the coarse acquisition code as a center bit and a second zero into the coarse acquisition code as an end bit such that a spacing between the first zero and the second zero is a predetermined number of samples and a length of the coarse acquisition code equals a pre-defined length;
calculate a frequency domain representation of the coarse acquisition code of the pre-defined length for determining whether the RF signal was transmitted by the at least one of the plurality of satellites;
an IFFT processing unit operable to:
determine a time domain representation of a result of multiplying the frequency domain representation of the compensated first set of samples and the frequency domain representation of the coarse acquisition code; and
a peak detection unit operable to:
identify a peak correlation value from the time domain representation; and
determine information about the at least one of the plurality of satellites based on the peak correlation value.

22. The satellite navigation receiver of claim 21, wherein the FFT engine operable to calculate the frequency domain representation of the compensated first set of samples further comprises the FFT engine operable to:
insert zeros into the compensated first set of samples such that a length of the compensated first set of samples equals the pre-defined length associated with the coarse acquisition code; and
calculate the frequency domain representation of the compensated first set of samples of the pre-defined length.

23. The satellite navigation receiver of claim 21, further comprising:
the coarse acquisition code processing unit operable to calculate a frequency domain representation of a coarse acquisition code of a second of the plurality of satellites for determining whether the RF signal was transmitted by at least the second of the plurality of satellites;
the IFFT processing unit operable to:
determine a second time domain representation of a result of multiplying the frequency domain representation of the compensated first set of samples and the frequency domain representation of the coarse acquisition code of the second of the plurality of satellites; and
the peak detection unit operable to:
identify a second peak correlation value from the second time domain representation; and
determine information about the second of the plurality of satellites based on the second peak correlation value.

24. The satellite navigation receiver of claim 21, further comprising:
the pre-FFT unit operable to:
compensate for the Doppler shift in a second set of the input samples to yield a compensated second set of samples, wherein the second set of the input samples correspond to the input samples received within a second time interval;
sum the compensated first set of samples with the compensated second set of samples to yield a pre-summed set of samples and to improve signal to noise ratio of the pre-summed set of samples;
the FFT engine operable to:
calculate a frequency domain representation of the pre-summed set of samples;
the IFFT processing unit operable to:
determine a second time domain representation of a result of multiplying the frequency domain representation of the pre-summed set of samples and the frequency domain representation of the coarse acquisition code;
the peak search module operable to:
identify a second peak correlation value from the second time domain representation; and
determine the information about the at least one of the plurality of satellites based on the second peak correlation value.

25. The satellite navigation receiver of claim 21, wherein the pre-FFT unit operable to compensate for the Doppler shift in the first set of the input samples further comprises the pre-FFT unit operable to:
calculate an estimated value of the Doppler shift; and
compensate for the Doppler shift by shifting the first set of the input samples by the estimated value of the Doppler shift.

26. The satellite navigation receiver of claim 21, further comprising:
the IFFT processing unit operable to:
calculate a second time domain representation of a result of multiplying the frequency domain representation of a compensated second set of samples and the frequency domain representation of the coarse acquisition code associated with the at least one of the plurality of satellites, wherein the compensated second set of samples correspond to the input samples received within a second time interval and compensated for the Doppler shift;
accumulate the first time domain representation with the second time domain representation to improve a signal to noise ratio and generate a significant peak correlation value; and
the peak detection unit operable to:
identify the peak correlation value in response to the inverse fast Fourier transform processing unit accumulating the first time domain representation with the second time domain representation.

27. The satellite navigation receiver of claim 21, wherein the peak detection unit operable to determine information about the at least one of the plurality of the satellites based on the peak correlation value comprises the peak detection unit operable to determine at least one of a current Doppler frequency, a code phase of the at least one of the plurality of satellites, a position of the at least one of the plurality of satellites, and timing information about the at least one of the plurality of satellites.

28. The satellite navigation receiver of claim 21, further comprising the pre-FFT unit operable to:
store the input samples of the RF signal in an RF buffer, wherein the input samples are associated with an input data rate;
retrieve the first set of input samples, at an output data rate, from the RF buffer to compensate for the Doppler shift in the first set of the input samples such that the output data rate is greater than the input data rate.

29. The satellite navigation receiver of claim 28, further comprising:
the pre-FFT unit operable to compensate each of a plurality of instances of the first set of input samples by a distinct Doppler shift; and
the peak search module operable to correlate the plurality of instances of the first set of input samples and the coarse acquisition code associated with the at least one of the plurality of satellites to determine information about the at least one of the plurality of satellites.

30. One or more non-transitory machine-readable storage media, having instructions stored therein, which when executed by one or more processors causes the one or more processors to perform operations that comprise:
receiving input samples of an RF signal from one or more satellites of a plurality of satellites in a satellite navigation system, wherein the RF signal is a combination of signals from the one or more satellites of the satellite navigation system;
compensating for Doppler shift in a first set of the input samples to yield a compensated first set of samples, wherein the first set of the input samples correspond to the input samples received within a first time interval;
calculating a frequency domain representation of the compensated first set of samples;
generating a coarse acquisition code associated with at least one of the plurality of satellites in the satellite navigation system;
inserting a first zero into the coarse acquisition code as a center bit and a second zero into the coarse acquisition code as an end bit such that a spacing between the first zero and the second zero is a predetermined number of samples and a length of the coarse acquisition code equals a pre-defined length;
calculating a frequency domain representation of the coarse acquisition code of the pre-defined length for determining whether the RF signal was transmitted by the at least one of the plurality of satellites;
determining a time domain representation of a result of multiplying the frequency domain representation of the compensated first set of samples and the frequency domain representation of the coarse acquisition code;
identifying a peak correlation value from the time domain representation; and
determining information about the at least one of the plurality of satellites based on the peak correlation value.

31. The machine-readable storage media of claim 30, wherein the pre-defined length is a length of the compensated first set of samples.

32. The machine-readable storage media of claim 30, wherein said operation of determining information about the at least one of the plurality of the satellites based on the peak correlation value comprises determining at least one of a current Doppler frequency, a code phase of the at least one of the plurality of satellites, a position of the at least one of the plurality of satellites, and timing information about the at least one of the plurality of satellites.

33. The machine-readable storage media of claim 30, wherein the operations further comprise:
calculating a frequency domain representation of a coarse acquisition code of a second of the plurality of satellites for determining whether the RF signal was transmitted by at least the second of the plurality of satellites;
determining a second time domain representation of a result of multiplying the frequency domain representation of the compensated first set of samples and the frequency domain representation of the coarse acquisition code of the second of the plurality of satellites;
identifying a second peak correlation value from the second time domain representation; and
determining information about the second of the plurality of satellites based on the second peak correlation value.

34. The satellite navigation receiver of claim 21, further comprising:
the pre-FFT unit operable to:
compensate for the Doppler shift in a second set of the input samples to yield a compensated second set of samples, wherein the second set of the input samples correspond to the input samples received within a second time interval;

sum the compensated first set of samples with the compensated second set of samples to yield a pre-summed set of samples and to improve signal to noise ratio of the pre-summed set of samples;

store the pre-summed set of samples in a pre-FFT buffer;

the FFT engine operable to:

obtain the pre-summed set of samples from the pre-FFT buffer;

calculate a frequency domain representation of the pre-summed set of samples;

the IFFT processing unit operable to:

determine a second time domain representation of a result of multiplying the frequency domain representation of the pre-summed set of samples and the frequency domain representation of the coarse acquisition code;

the peak search module operable to:

identify a second peak correlation value from the second time domain representation; and determine the information about the first of the plurality of satellites based on the second peak correlation value.

\* \* \* \* \*